United States Patent [19]

Rogier

[11] 4,363,383

[45] Dec. 14, 1982

[54] BRAKE WITH AXIALLY EXPANDING BRAKE SHOES

[75] Inventor: Léonce E. R. Rogier, St Denis, France

[73] Assignee: Societe Anonyme Francaise du Ferodo, Paris, France

[21] Appl. No.: 94,548

[22] Filed: Nov. 15, 1979

[30] Foreign Application Priority Data

Nov. 16, 1978 [FR] France .............................. 78 32329

[51] Int. Cl.³ ............................................ F16D 55/18
[52] U.S. Cl. .................................... 188/72.5; 188/368
[58] Field of Search ................... 188/1 A, 71.5, 72.5, 188/196 P, 367, 368, 218 XL

[56] References Cited

U.S. PATENT DOCUMENTS

| 2,837,178 | 6/1958 | Burnett | 188/72.5 X |
| 2,856,034 | 10/1958 | Mossey | 188/72.5 |
| 2,938,609 | 5/1960 | Burnett | 188/196 P X |
| 3,593,266 | 7/1971 | Van Sickle | 188/1 A X |

Primary Examiner—Duane A. Reger
Attorney, Agent, or Firm—Charles E. Brown

[57] ABSTRACT

A brake having axially-expanding brake shoes, comprises an actuating block radially located in a peripheral annular groove formed in a rotating member. The actuating block possesses along its axis, a plurality of cylinders in which slide pistons which apply the brake shoes against the braking surfaces formed by the opposite radially-extending faces of the groove.

According to the invention, the actuating block comprises a single, solid, center support plate, and the ends of the cylinders project axially over the transverse faces of this support plate.

16 Claims, 4 Drawing Figures

BRAKE WITH AXIALLY EXPANDING BRAKE SHOES

BACKGROUND OF THE INVENTION

1. Field of the Invention

The present invention relates in general terms to brakes with axially expanding brake shoes, that is to say brakes of the kind which comprise a rotating member possessing a peripheral annular groove, the opposite radially extending faces of which form two braking surfaces, and at least one actuating block radially engaged in the said groove and connected to support means, the said actuating block comprising, for each braking surface, at least one actuating unit suitable for applying a brake shoe against the braking surface.

Such brakes with axial expansion are useful particularly in cases where high-energy braking is necessary, whether this be for ground gear, such as a winding drum or cable drum, or for a vehicle, such as a railway vehicle or a heavy road vehicle.

The present invention relates, in particular, to those brakes with axially expanding brake shoes in which each actuating unit comprises a cylinder, which is open at both its ends, and two pistons, which are mounted so as to move in opposite directions in the said cylinder, the said cylinder and the said pistons defining a fluid chamber interconnected to a feed nozzle suitable for connection to a pressurized fluid source.

2. Discussion of the Prior Art

Such a brake is described, for example, in U.S. Pat. No. 2,957,552.

In this American patent, the actuating block employed is bulky, the cylinders of the actuating units which it comprises being directly formed by bores in this block, and the axial thickness of the latter being substantially equal to the axial length of these cylinders.

This results in a relatively heavy and hence expensive construction.

In contrast, the French Pat. No. 2,188,732 has already proposed a relatively light construction, in which the actuating block is formed of two thin plates which are set up parallel to one another and separated from one another, these plates being strutted at certain places by means of tubes which form cylinders.

Thus, between such tubes, the two plates are separated from one another by an open space.

However, in practice, a construction of this type involves welding which, because of the heating resulting therefrom, lead to deformation and in particular to ovalisation of the cylinders.

Moreover, although such deformation is in fact mechanically acceptable, a construction of this type, with welds, cannot easily be manufactured by a process which is other than small-scale, and the characteristics which can thereby be achieved therefore will be considerably non-uniform.

SUMMARY OF THE INVENTION

The invention relates to a brake with axially expanding brake shoes, of the kind which comprises a rotatable member, a peripheral annular groove in said rotatable member, the opposite radially extending faces of which form two braking surfaces, and at least one actuating block radially engaged in the said groove and connected to support means, the said actuating block possessing, for each of the said braking surfaces, at least one actuating unit comprising a cylinder which is open at least at one of its ends, which end being the end corresponding to the said braking surface, and a piston which is mounted so as to move in the said cylinder, at the said end, the said cylinder and the said piston defining a fluid chamber which is joined to a feed nozzle suitable for connection to a pressurised fluid source, the improvement comprising the said actuating block being a single, solid, centre support plate, and the end portions of the cylinder of the actuating unit or units, forming part of this actuating block for the corresponding braking surface, axially project over each of the radially extending faces of the said support plate.

In this context, the term "solid" support plate is understood as meaning, in the customary manner, a component of which the two radially extending faces are axially joined to one another in a continuous manner by material, with the exception of the cylinders carried by this component and a few local recesses.

According to one embodiment, the cylinder of each actuating unit is integral with the support plate and forms a single component therewith.

However, according to a preferred embodiment, with the cylinder of an actuating unit being open at both its ends, and two pistons being able to move therein in opposite directions so that each one can cooperate respectively with the braking surface, this cylinder forms a tubular component which is separate from the support plate, the said tubular component being engaged, if necessary by force and/or with the aid of adhesive, in a complementary passage provided in the said plate.

Whatever the case may be, the construction according to the invention advantageously combines a high degree of lightness with the absence of deformations.

Moreover, it is relatively economical and finally, it exhibits the following further advantages.

In particular, as the fluid chamber of an actuating unit is to communicate with the fluid chamber of the adjacent actuating unit, provision is made, according to the invention, for the corresponding communication to be made by a passage formed inside the support plate itself, utilising the axial thickness of the latter for this purpose.

As a result, no tube is needed for such communication, and the danger of a connecting tube being liable to some kind of damage is thereby avoided. No leakage due to this tube need therefore be feared.

Moreover, since the corresponding communication is made as short as possible, because it is inside the support plate, the response time of the brake is reduced to a minimum.

DESCRIPTION OF THE PREFERRED EMBODIMENT

Figure 1:
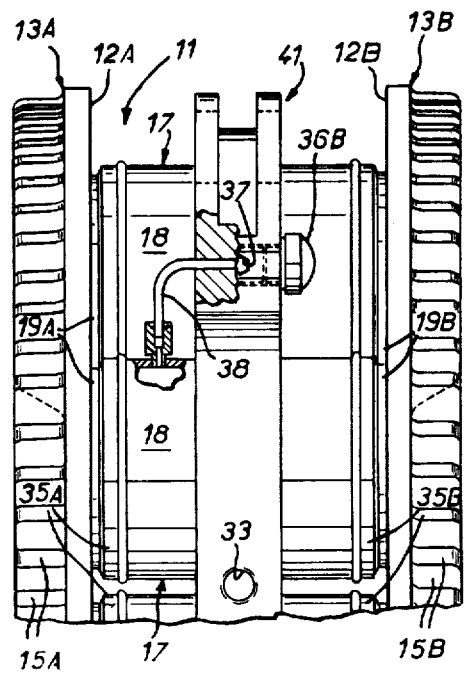
FIG. 1 is a view, partially in section and partially in side elevation, of a brake with axial expansion, according to the invention, along the broken line I—I of FIG. 2.
Figure 2:
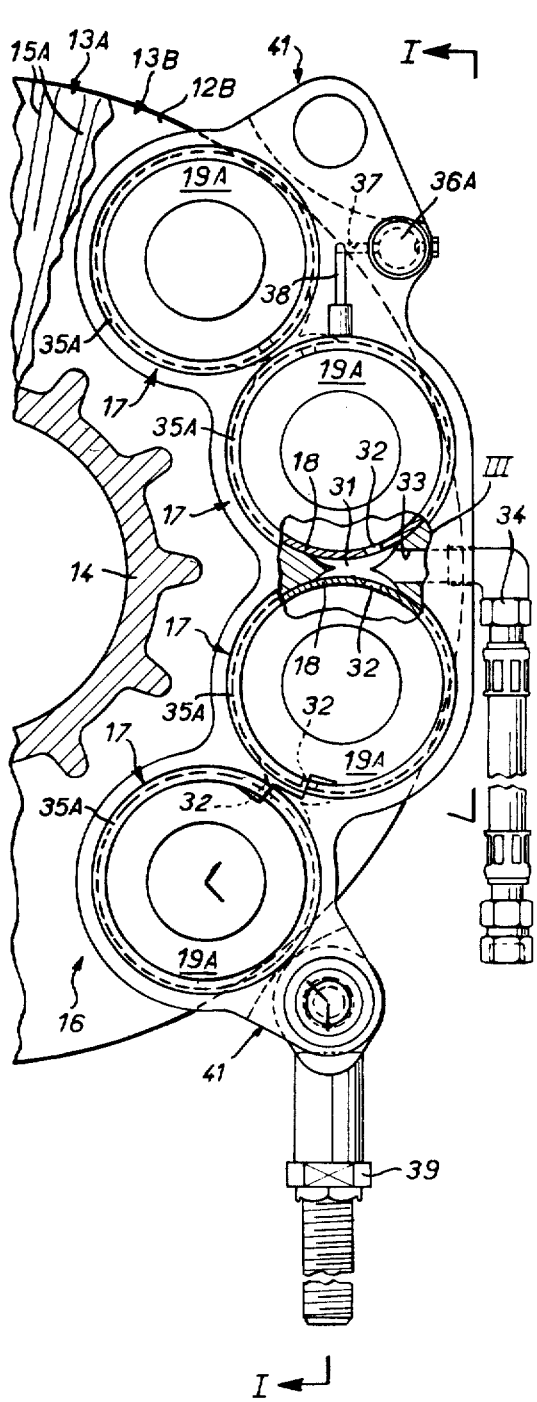
FIG. 2 is a partial view in front elevation of this brake, with parts cut away, along the arrow II of FIG. 1.
Figure 3:
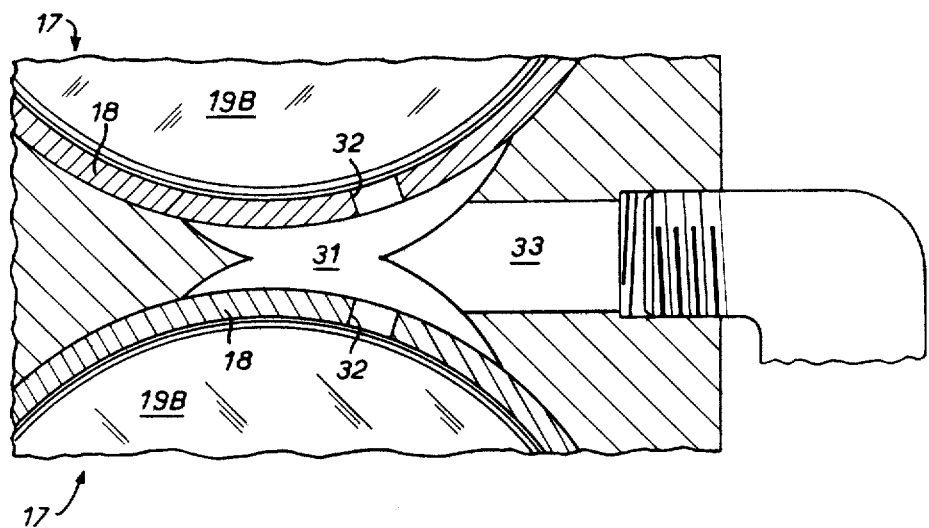
FIG. 3 reproduces, on a larger scale, a constructional detail marked by an inset III in FIG. 2.

Referring to the drawings there is shown a brake with axially expanding brake shoes, according to the invention, comprising a rotatable member 10 in which there is a peripheral annular groove 11 of which the opposing radially extending faces 12A, 12B form two parallel braking surfaces.

In practice, these faces 12A, 12B are formed by the internal faces of parallel annular plates 13A, 13B, which are carried by a common hub 14, and the external faces of which possess cooling ribs 15A, 15B.

At least one actuating block 16 is radially engaged in the groove 11 in this rotatable member 10.

In practice, two actuating blocks 16 can be provided in positions which are diametrically opposite one another. However, the Figures show only one actuating block 16.

This actuating block, which is secured to support means described in detail below, comprises at least one actuating unit 17 formed of a cylinder 18, which is open at both its ends, and of two pistons 19A, 19B, which are mounted so as to move in opposite directions in the cylinder 18, and each of which is intended to bear on the faces 12A, 12B which form the braking surfaces.

This actuating block 16 further comprises a single, solid, centre support plate 20, and the end portions 22A, 22B of the cylinder 18 of each actuating unit 17 axially project beyond each of the radially extending faces 21A, 21B of the said support plate 20.

In the embodiment illustrated in the Figures, the cylinder 18 of an actuating unit 17 forms an individual, tubular component which is separate from the support plate 20, the said tubular component being engaged in a complementary aperture 24 in the support plate 20 by a force-fit.

Figure 4:
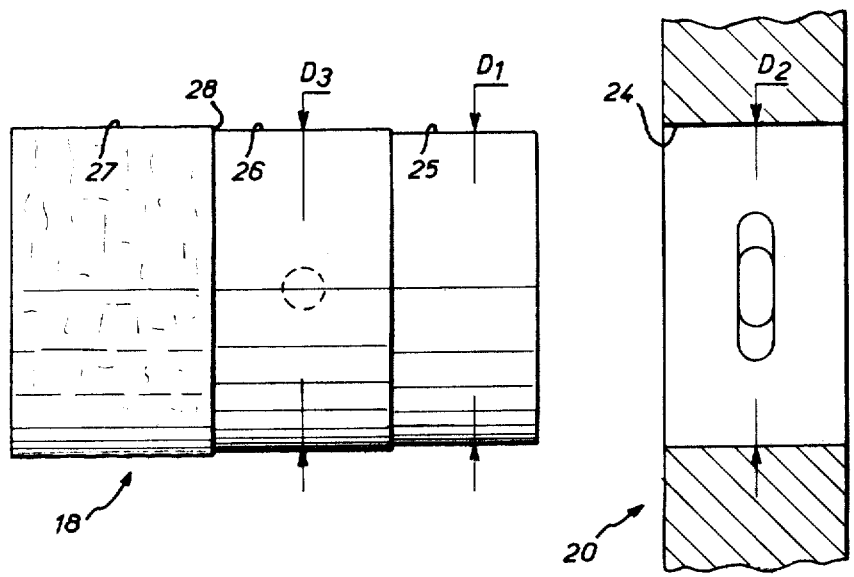
FIG. 4 is a view of the type shown in FIG. 1, on a larger scale, illustrating the mounting of a cylinder onto the corresponding support plate.

As illustrated in detail in FIG. 4, the cylinder 18 of an actuating unit 17 comprises three successive external bearings, namely a first bearing 25, hereafter referred to as the front bearing and having a diameter D1 which is substantially smaller than the diameter D2 of the corresponding aperture 24 in the support plate 20, a second bearing 26, hereafter referred to as the centre bearing and having a diameter D3 which is only just smaller than that of the aperture 24, and a third bearing 27, hereafter referred to as the rear bearing.

In this case, only the front bearing 25 and the centre bearing 26 need to be machined.

In contrast, the rear bearing 27 may remain as manufactured; in other words, it need not be machined.

In practice, the centre bearing 26 of a cylinder formed in this way is separated from the rear bearing by a shoulder 28 which extends radially to a greater or lesser degree.

Engagement of this cylinder 18 in the corresponding aperture 24 in the support plate 20 is effected by inserting firstly its front bearing 25 into the aperture, engagement being facilitated by the small diameter of the front bearing 25.

This engagement continues by inserting into the aperture 24 the centre bearing 26 until the shoulder 28 abuts the corresponding radially extending face of the support plate 20.

The difference in diameter between the centre bearing 26 of the cylinder 18 and the corresponding aperture 24 in the support plate 20 is chosen to be just sufficient to allow the necessary clearance therebetween to engage the centre bearing in the respective aperture by a force-fit.

If desired, the centre bearing 26 of a cylinder 18 is coated with glue prior to engaging the cylinder in the aperture 24.

In either case, each cylinder 18 defines internally, together with the pistons 19A, 19B which it contains, a fluid chamber 30, which is rendered leaktight by means of gaskets 31A, 31B provided between the cylinder 18 and the pistons 19A, 19B.

The fluid chamber 30, which thus forms part of the actuating unit 17, communicates with the fluid chamber 30 of the adjacent actuating unit, via a passage 31 formed inside the support plate 20 itself.

This passage 31 can be formed, for example, by milling, from one or both of the respective apertures 24, or by rendering part of the wall which separates these apertures from one another with a cutting torch.

Each cylinder 18 is pierced with at least one hole 32 at right-angles to this passage 31.

Thus, the various fluid chambers 30 in the actuating block 16 are interconnected, at least one of them being furthermore connected by means of a radial bore 33 in the support plate 20, to a feed nozzle 34, which is carried on the outside of the plate, at its edge, and which can be joined to a pressurised fluid source (not shown).

In practice, with four actuating units 17 being provided in the illustrated embodiment, the bore 33 emerges at right-angles to the passage 31 interconnecting the two central actuating units.

Dust covers 35A, 35B are provided at the extremity of the end portions 22A, 22B of each cylinder 18.

The actuating block 16 is furthermore equipped, in a manner which is in itself known, with at least one warning device, or other indicating means, which is sensitive to the pressure prevailing in the cylinder 18 of at least one of its actuating units, at a defined distance from the corresponding braking surface 12A, 12B.

Two warning devices 36A, 36B are in fact, provided in parallel, one being located on the radially extending face 21A of the support plate 20 and the other being located on the radially extending face 21B of the support plate, the said warning devices being connected to a common bore 37 in the support plate, which bore communicates, via a pipe 38, with the cylinder 18 of any one of the actuating units 17.

Finally, as mentioned above, the actuating block 16 is joined to support means.

These support means comprise two rods, not shown in the Figures, each of which is suitable for connection to two support nozzles 39, which are each provided at the ends of the actuating block 16, and only one of which is shown in the Figures.

In a known manner, the connection between the actuating block 16 and the support nozzle 39 is made by a swivel joint 40, the support plate 20 of the actuating block 16 forming a yoke 41 which is joined, for example as shown, to the inner cage 42 of the swivel joint 40 while the corresponding support nozzle 39 is joined to the outer cage 43 of the swivel joint 40.

The arms of the yoke 41 extend as far as the immediate vicinity of the support nozzle 39, surrounding the latter, and thus form stopping means suitable for cooperating with this support nozzle in order to restrict the movement of the actuating block 16.

When pressurised fluid reaches the feed nozzle 34, it simultaneously enters the fluid chambers 30 in the two central actuating units 17, and then, via these chambers, enters the fluid chambers 30 in the two end actuating units 17.

Since the communication paths between these fluid chambers are short, the response time of whole unit is advantageously reduced.

Under the action of the pressurised fluid which thus reaches an actuating unit 17, the two pistons 19A, 19B of the latter, which themselves form brake shoes, are simultaneously applied onto the braking surfaces 12A, 12B of the rotatable member 10, and the latter is thus braked.

When the pressurised fluid feed is interrupted, the rotatable member 10 is released.

Initially, the tube 38 to which the warning devices 36A, 36B are connected emerges, in the respective cylinder 18, at a location spaced from the corresponding fluid chamber 30.

The axial extension of this fluid chamber increases in accordance with the wear of the pistons 19A, 19B; when this extension is sufficient to affect the tube 38, the warning devices 36A, 36B are simultaneously brought into action, indicating that a piston change is necessary.

The fact that two warning devices are thus actuated simultaneously, on the right and on the left of the support plate 20, advantageously permits an indiscriminate arrangement of the brake according to the invention, on the right or on the left, relative to whichever axle is to be braked.

Of course, the present invention is not restricted to the embodiment which has been described and illustrated, but it encompasses all modified embodiments.

In particular, the cylinder 18 of each actuating unit 17 can be integral with the support plate 20 and can form a single component together therewith, for example by moulding the cylinders 18 and support plate 20 together.

In the embodiment where the cylinder 18 forms a separate component, it is advantageous to mount the cylinder on the support plate by simple engagement and, if necessary, sticking. No machine-finishing is necessary after assembly of the cylinders 18 and support plate 20. This embodiment is therefore particularly economical.

If desired, at least part of the cylinders can furthermore be individually protected anodically before they are mounted.

Moreover, it is possible to arrange an obturator in one cylinder or in each of several cylinders, and this permits stepwise adjustment of the resulting braking torque.

Furthermore, it is not necessary for one and the same pressure chamber to be common to two pistons 19A, 19B which can move in one and the same cylinder 18.

The cylinder may comprise a central internal partition which divides it into two pressure chambers, one of which is associated with the piston 19A and the other associated with the piston 19B.

It is also not necessary for the actuating units to be in pairs along their mutual axis from one radially extending face of the support plate to the other; on the contrary, they alternate, those which cooperate with a first braking surface being circularly staggered relative to those which cooperate with the second braking surface. In this case, for each braking surface only the relevant end of the cylinder of each actuating unit can, if desired, project axially over the corresponding radially extending face of the support plate.

I claim:

1. A brake with axially expanding brake shoes comprising a rotatable member, a peripheral annular groove in said rotatable member, opposite radially extending faces of said rotatable member forming two braking surfaces, at least one actuating block radially engaged in said groove and connected to support means, said actuating block including for each of said braking surfaces, at least one actuating unit comprising a cylinder having at least one open end opening onto its associated braking surface, and a piston mounted for movement at said open end of each of said cylinders, each of said cylinders defining with its associated piston a fluid chamber which is in communication with a feed nozzle connectable to a pressurized fluid source, said actuating block being joined to said support means by a swivel joint having an internal and an external cage, said actuating block forming a yoke joined to one of said cages of said swivel joint, the other of said cages being joined to said support means and said yoke forming means cooperable with said support means for restricting movement of said actuating block.

2. A brake according to claim 1, wherein said actuating block comprises a single, solid, center support plate, and end portions of said cylinders, axially projecting beyond each radially extending face of said support plate toward the respective braking surfaces.

3. A brake according to claim 2, wherein each said cylinder is open at both ends, two said pistons being movable in each said cylinder in opposite direction for co-operation with the respective braking surfaces, each said cylinder being a tubular component separate from said support plate and force-fitted in a complementary aperture provided in said support plate.

4. A brake according to claim 3, wherein each said cylinder has three successive external bearing surfaces including a first or front bearing surface having a diameter substantially smaller than that of the corresponding aperture in said support plate, a second or center bearing surface having a diameter slightly smaller than that of said corresponding aperture and an unmachined, third or rear bearing surface.

5. A brake according to claim 4, wherein a radially extending shoulder is disposed between said second or center bearing surface of said cylinder and said third or rear bearing surface thereof.

6. A brake according to claim 3, wherein said cylinder is bonded to said support plate.

7. A brake according to claim 1 or 2, wherein each said cylinder is integral with said support plate forming a single component therewith.

8. A brake according to claim 1 or 2, wherein said fluid chambers of adjacent said actuating units communicate with each other through a passage formed in said support plate.

9. A brake according to claim 8, there being a plurality of said cylinders and pistons, said fluid chambers being connected in pairs, a single said fluid chamber being connected to said feed nozzle.

10. A brake according to claim 1 or 2, further comprising two warning means responsive to pressure in a said cylinder, one of said warning means being located on a first radially extending face of said support plate and the other of said warning means being located on a second radially extending face of said support plate.

11. A brake having axially expanding brake shoes comprising a rotatable member, an annular peripheral groove in said rotatable member, opposite radially extending faces of said rotatable member forming two braking surfaces, at least one actuating block radially engaged in said groove and connected to support means, said actuating block having at least one actuating unit comprising a cylinder open at both ends onto respective braking surfaces, a piston mounted for movement at each of said open ends of said cylinder in opposite directions for cooperation with the respective braking surfaces, said cylinder defining with said pistons a fluid chamber in communication with a feed nozzle adapted to be connected to a source of pressurized fluid, said actuating block comprising a single, solid, center support plate, end portions of said cylinder forming part of said actuating block for the corresponding braking surfaces axially projecting beyond each radially extending face of said support plate, said cylinder being a tubular component separate from said support plate, said tubular component being in force-fitted in a complementary aperture in said support plate, said cylinder having three successive external bearing surfaces including a first or front bearing surface having a diameter substantially smaller than that of said aperture in said support plate, a second or center bearing surface having a diameter slightly smaller than that of said aperture and an unmachined, third or rear bearing surface.

12. A brake according to claim 11, wherein a radially extending shoulder is disposed between said second or center bearing surface of said cylinder and said third or rear bearing surface thereof.

13. A brake according to claim 12, wherein said cylinder is bonded to said support plate.

14. A brake according to claim 11, wherein said fluid chambers of adjacent said actuating units communicate with each other through a passage formed in said support plate.

15. A brake according to claim 11, there being a plurality of said cylinders and pistons, said fluid chambers being connected in pairs, at least one of said fluid chambers being connected to said feed nozzle.

16. A brake according to claim 11, further comprising two warning means responsive to pressure in said cylinder, one of said warning means being located on a first radially extending face of said support plate and the other of said warning means being located on a second radially extending face of said support plate.

* * * * *